United States Patent Office 3,118,871
Patented Jan. 21, 1964

3,118,871
MONAZINIUM AZO COMPOUNDS
Frederick Brody and Walter J. Sydor, Somerville, N.J., assignors to American Cyanamid Company, New York, N.Y., a corporation of Maine
No Drawing. Filed Dec. 12, 1960, Ser. No. 75,122
6 Claims. (Cl. 260—156)

This invention relates to new azo dyes. More particularly it is concerned with a new class of azo dyes particularly well suited for dyeing acrylic fibers. It also deals with the production of these dyes and still further with their use as a starting material for the preparation of other dyes for acrylic fibers.

Dyeing of acrylic fibers is becoming a well known art. One illustrative method of dyeing from weakly acidic baths is shown in U.S. Patent No. 2,863,816. Unfortunately in using many of the dyes currently available, the resultant shade of dyeing is not as strong as is desired for industrial use.

It is, therefore, a principal object of this invention to provide an entirely new class of azo dyes suitable for dyeing acrylic fibers which is not subject to this drawback. It is a further object of this invention to provide a series of dyes which are not only highly useful per se but can be used as starting materials in the preparation of additional highly desirable quaternary azo dyes suitable for the purpose.

In accordance with this invention, these objects have been accomplished by the preparation of new dyestuffs represented by the formula $$[R-N=N-Ar]^+ \ X^- \quad (1)$$

wherein R is an ortho-N-alkoxy monazinium radical of less than three 6-membered rings and Ar is the radical of an aromatic carbocyclic coupling component of less than three 6-membered rings having an amino substituent in a position conjugated with the azo linkage, the conjugated amino group being of the formula

wherein R″ and R′ are either hydrogen, lower alkyl, aralkyl, cyano-lower alkyl or hydroxy-lower alkyl and when joined together, —CH$_2$—CH$_2$—CH$_2$—CH$_2$—,

—CH$_2$—CH$_2$—O—CH$_2$—CH$_2$—,

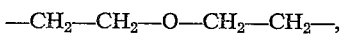

and —CH$_2$—CH$_2$—CH$_2$—CH$_2$—CH$_2$—.
Suitable substituents are amoni, mono- or di-(lower alkyl) amino, aralkylamino, (cyano-lower alkyl) amino, di-(cyano-lower alkyl) amino, (hydroxy-lower alkyl) amino and a tertiary monocyclic amino such as morpholino, piperidino, piperazino and pyrrolidino; and X is an anion.

The compounds of this invention are prepared by a two-step process comprising first coupling a 2-amino-monazine N-oxide of less than three 6-membered rings and an aromatic amine of less than three 6-membered rings by conventional procedures and then alkylating, with an alkylating agent, the oxide radical on the nitrogen of the resulting 2-aminoarylazo-monazine oxide to yield the N-alkoxy monaziniums of this invention.

Suitable aromatic amines for this purpose are aniline, N,N-dimethylaniline, 3-methyl-N,N-dimethylaniline; 3-ethoxy-N,N-diethylaniline, 2,6-diethylaniline, 1,5-diaminonaphthalene, N-methyl-N-β-cyanoethylaniline, N,N-bis(β-cyanoethyl)aniline, 3-methoxy-N-methyl-N-β-cyanoethylaniline, N,N-diethylaniline, α- or β-naphthylamine, N-methyldiphenylamine, N-methyl-α-naphthylamine, 2,5-dimethoxyaniline, N,N-bis(β-hydroxyethyl)-aniline, 2,4-diaminotoluene, N-acetyl-m-phenyl enediamine, N-o or m-tolylmorpholine, N-phenylmorpholine, N-phenylpyrrolidine, N-phenylpiperazine, N-phenylpiperidine.

Examples of the suitable monazine reactants are the N-oxides of 2-aminopyridine and the 3-, 4-, 5-, and/or 6-lower alkyl (e.g., methyl) derivatives thereof (e.g., the N-oxide of 2-amino-4,6-dimethylpyridine), additionally substituted, if desired, with chloro, bromo and alkoxy groups; the N-oxides of 2-aminoquinoline as well as its lower alkyl, lower alkoxy and halogen derivatives and the N-oxide of 1-aminoisoquinoline and its alkyl, alkoxy, and halogen derivatives. Among the specific starting materials which can be named are: the N-oxide of 2-amino-3-ethyl-6-methylpyridine, the N-oxide of 2-amino-4-ethylpyridine; the N-oxide of 2-amino-5-chloropyridine; the N-oxide of 2-amino-3,5-dichloropyridine; the N-oxide of 2-amino-5-ethoxypyridine; the N-oxide of 2-amino-8-ethoxyquinoline; the N-oxide of 2-amino-8-methylquinoline; the N-oxide of 4-chloro-1-aminoisoquinoline; and the N-oxide of 1-amino-3-methylisoquinoline. Where previously not known, the N-oxides can be prepared from known amino monazines by the conventional N-oxidation procedures (e.g. treatment with peracetic acid).

Coupling is conducted in the usual general procedure by diazotizing the 2-amino monazine N-oxide and treating the thus formed diazo solution with the amine to be coupled. The resulting 2-arylazo monazine N-oxide can be optionally purified prior to being subjected to the second step of alkylation.

The 2-arylazo monazine N-oxide is converted to its N-alkoxy derivatives by an alkylation reaction. The alkylation step may be conducted in any suitable organic solvent such as orthodichlorobenzene or mononitrobenzene. In general, solvents used for this purpose should be high boiling, since lower boiling solvents tend to decrease yields. For optimum results, the N-oxide should be carefully and thoroughly mixed and preferably homogenized with the solvent prior to treatment with the alkylating agent.

Suitable alkylating agents are compounds of the formula: RX wherein R is alkyl and X is an inorganic anion (e.g., dialkyl sulfates, alkylnitrates, alkylchlorides, alkylbromides and alkyl iodides). A dialkyl sulfate reagent is preferable since in many cases it results in a more nearly pure or more-readily purified product. However, the anion of the alkylating agent has no effect upon the utility of the alkylated product.

Compounds of this invention when used as dyes give full, strong shades when dyed on acrylic fibers according to known procedures as for example from weakly acid baths according to the method shown in the above noted U.S. Patent No. 2,893,816. Difficulties in obtaining such full, strong shades in this method have been eliminated to a surprisingly successful degree.

As was also discussed above, in addition compounds of this invention are highly useful as starting materials for the preparation of corresponding N-alkyl compounds. These latter also are highly-useful dyestuffs for the same purpose. As such they form part of the subject matter of copending application 764,239, filed September 30, 1958. For this purpose, the N-alkoxy derivatives are dealkoxylated, e.g. demethoxylated, to yield the corresponding N-unsubstituted 2-arylazo monazines which are then quaternized by treatment with an alkylating agent such as an alkyl iodide e.g. ethyl iodide. The dealkoxylating process of this invention comprises treating the N-alkoxy derivative in aqueous alcoholic medium with ammonia. Thus, the water, alcohol and ammonia can first be mixed together and then added to the N-alkoxy-monazine, or the monazine can be mixed with the aqueous alcoholic medium and then ammoniated. In a preferred embodiment, the aqueous alcoholic solution of ammonia is contacted with the monazine, the mixture is heated and additional ammonia is passed in during the reaction. Reaction temperatures range from about 60° C. to reflux. Any lower alcohol can be employed, but ethanol is preferred for better yields of products of high purity. Too much water in the reaction results in decreased yields and thus the water concentration should be kept low, preferably below 25%.

The dealkoxylated product which is thus obtained may be isolated from the reaction mixture by adding a high boiling solvent such as orthodichlorobenzene and distilling off the by-products (alcohol and water) leaving a residue, which, after clarification, may be directly quaternized or else first converted to its hydrochloride from which the free base can be obtained by treatment with a solution of a salt of a strong base and a weak acid, e.g., sodium acetate. The free base thus obtained is then readily quaternized by conventional procedures e.g., by treatment with an alkyl iodide or sulfate, e.g., methyl sulfate, ethyl sulfate, methyl iodide and ethyl iodide.

The fibers which can be dyed with the compounds of this invention are, in general, acrylic fibers which are polymers and copolymers of acrylonitrile. These include such typical illustrative copolymers as those of acrylonitrile and vinylpyridine, acrylonitrile, vinylacetate and vinylpyridine; copolymers of vinylidene cyanide, methyl vinylpyridine and vinyl acetate; combinations of these copolymers; and acrylonitrile fibers wet spun from concentrated aqueous thiocyanate solutions. The compounds of this invention have particular affinity for acrylic polymers which comprise at least 70% by weight of polymerized acrylonitrile.

The following examples are presented to further illustrate this invention. Parts are by weight unless otherwise stated.

EXAMPLE 1

A. *Preparation of 2-(p-Dimethylaminophenylazo)-Pyridine-1-Oxide*

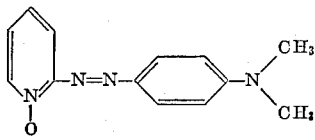

A solution is prepared by mixing:

22.02 parts of 2-aminopyridine-1-oxide
140 parts by volume of 5 N hydrochloric acid
100 parts of water The solution is cooled to 10° C. and diazotized at 12° (±2°) C. by the gradual addition of 27.2 parts by volume of 7.5 N sodium nitrite solution. It is stirred with a slight excess of nitrous acid and treated with 0.5 part of sulfamic acid. The resulting solution of the diazo is diluted with 200 parts by volume of water and cooled to 5° C. with the addition of ice. It is treated with a solution of 26.0 parts of dimethylaniline in 25 parts by volume of glacial acetic acid. The resulting mixture is stirred at 12° C. until coupling is complete. It is partially neutralized with 100 parts by volume of 40% sodium acetate solution and, after stirring, another equal addition of sodium acetate is made. The slurry is stirred until precipitation is complete. The precipitate is filtered off, washed with water and dried to yield the product 2-(p-dimethylaminophenylazo)pyridine-1-oxide.

B. *Treatment of the Product of Part A With Methyl Sulfate*

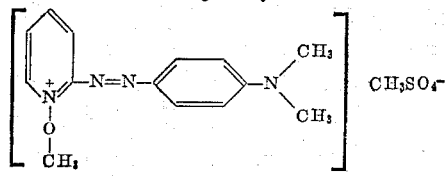

A mixture of:
4.85 parts of the product of part A
60 parts by volume of ortho dichlorobenzene and
5.04 parts of dimethyl sulfate is stirred until reaction is complete. The solid is isolated by filtration, washed with ortho-dichlorobenzene and with benzene and dried at 75° C. It is recrystallized from 90% benzene-10% methyl alcohol to yield the crystalline product.

The product dyes fibers of 94% polyacrylonitrile and 6% ethylacrylate bright violet when applied from a weakly acid bath.

Substitution of the equivalent amounts of α-naphthylamine or N-β-cyanoethylaniline for the N,N-dimethyl aniline used in Example 1 yields the products 2-(4-amino-1 - naphthylazo)-N-methoxypyridinium methosulfate and 2-(p-β-cyanoethylaminophenylazo)-N-methoxypyridinium methosulfate, respectively.

Following the procedure of Example 1 except for the substitution of an equivalent amount of the N-oxide of 2-amino-8-ethoxyquinoline for the N-oxide of 2-aminopyridine, there is obtained as product, N-methoxy-2-p-dimethylaminophenylazo-8-ethoxyquinolinium methosulfate.

EXAMPLE 2

*Treatment of the Product of Part A of Example 1 With Methyl Iodide*

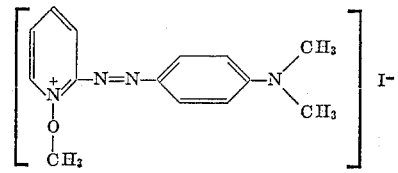

A mixture of 2.42 parts of the product of part A of Example 1, 60 parts by volume of absolute methanol and 13.6 parts of methyl iodide is heated at reflux until reaction is complete. The mixture is diluted with 300 parts by volume of benzene. The quaternized product is filtered, washed with benzene and dried. Its shade when dyed on fibres of 94% polyacrylonitrile and 6% ethylacrylate, is substantially the same as that of the dye of Example 1(B) and it has good color value.

EXAMPLE 3

*Dyeing of the Product of Example 1(B) on Orlon 42*

15 mg. of the product of Example 2 is dissolved in 200 ml. of water and brought to the boil. 2 ml. of a 5% solution of 28% acetic acid is added and a 5-gram skein of fibers of 94% polyacrylonitrile and 6% ethylacrylate is introduced. The dyeing is carried out for one hour at the boil. The bath is completely exhausted. The skein is removed, washed with water and dried. It is a bright violet shade of good color value.

EXAMPLE 4

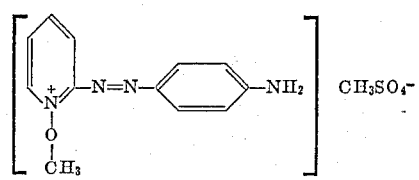

A slurry of 90 parts of 2-(p-aminophenylazo)pyridine-1-oxide, prepared by the method of Example 1 from aniline omega salt and 2-aminopyridine-N-oxide, in 1,130 parts by volume of methanol is stirred at reflux for twenty minutes. 3,380 parts by volume of ethyl acetate are added and the slurry heated at reflux two hours. It is filtered hot and the product washed with portions of 100 parts by volume of ethyl acetate and dried at 85° C.

A slurry of 10.7 parts of the purified product thus obtained in 100 parts by volume of orthodichlorobenzene, is heated to 60° C. and 5.13 parts of dimethyl sulfate are added gradually over at 60° C. The slurry is heated at 65–70° C. until reaction is complete. The product is then isolated by filtration. It may be freed from excess orthodichlorobenzene by slurrying in petroleum ether and dried under vacuum at about 65° C. It dyes fibers of 94% acrylonitrile and 6% ethylacrylate a bluish red of good color value.

Following the procedure of Example 4 except for the substitution of an equivalent amount of the N-oxide of 1-amino-3-methyl-isoquinoline for the pyridine material used therein, there is obtained as product the methosulfate of 1-p-aminophenylazo-2-methoxy-3-methyl-isoquinoline.

EXAMPLE 5

*Methosulfate of 2-(p-Aminophenylazo-N-Methoxypyridine)*

2.68 parts of purified 2-(p-aminophenylazo)pyridine-1-oxide are stirred with 35 parts by volume of redistilled nitromethane and brought to a temperature of 50° C. Then very gradually over a long period 1.28 parts by volume of methyl sulfate are added. The mixture is then stirred at 50° C. until reaction is complete. The product is isolated by filtration and dried. A product of high purity is obtained.

EXAMPLE 6

*Demethoxylation of 2-p-Aminophenylazo-N-Methoxypyridinium Methosulfate*

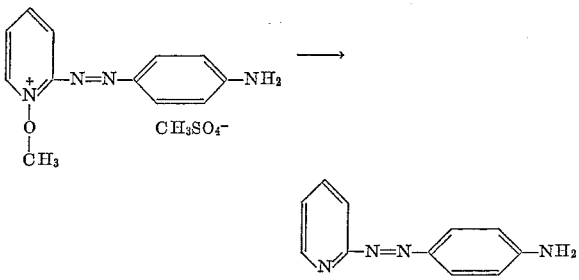

A solution of 100 parts by volume of 86.3% denatured ethyl alcohol, 2.6 parts of 1-methoxy-2-(p-aminophenylazo)pyridinium methyl sulfate and 2.1 parts by volume of concentrated ammonium hydroxide solution is refluxed for two hours. Then 3 parts by volume of concentrated ammonium hydroxide are added and refluxing is continued until demethoxylation is complete. The course of the reaction is followed by paper chromatography, the starting material being a red and the end product, a yellow. Cross spotting with acetic acid and with sodium acetate distinguishes the end product from the starting material.

To isolate the product, 200 parts by volume of orthodichlorobenzene and 70 parts by volume of monochlorobenzene are added and the mixture distilled at reduced pressure until the vapor temperature is constant. The solution is clarified by filtration and saturated with hydrogen chloride gas. The precipitated hydrochloride is isolated by filtration.

The 2-(p-aminophenylazo)-pyridinium hydrochloride is converted to the free base by dissolving in 150 parts of water and precipitating with 30 parts by volume of 40% sodium acetate solution.

EXAMPLE 7

*Demethoxylation of the Product of Example 4*

A solution of 200 parts by volume of 86.3% denatured ethyl alcohol, 8.72 parts of the product of Example 4 and 3 parts by volume of concentrated ammonium hydroxide is heated at reflux for two hours. Then 4.5 parts by volume of ammonium hydroxide are added and the refluxing continued until demethoxylation is complete. 300 parts of water are added and the mixture distilled until the vapor temperature is 100° C. The solution is clarified by filtration and cooled. The product, 2-(p-aminophenylazo)-pyridine, precipitates and is isolated by filtration, washed with water and dried in vacuum at 65° C.

EXAMPLE 8

*Demethoxylation of the Product of Example 4 (With Ammonia Gas Added during Reaction)*

A solution of 200 parts by volume of 86.3% denatured ethyl alcohol, 8.72 parts of the product of Example 4 and 6 parts by volume of concentrated ammonium hydroxide is heated at reflux while bubbling in ammonia, until demethoxylation is complete. Then 300 parts by volume of orthodichlorobenzene and 200 parts by volume of monochlorobenzene are added and the mixture distilled at reduced pressure until the head temperature is 70°/40 mm. About 380 parts by volume of distillate is collected. The remaining solution is filtered hot, and the residue is extracted with 75 parts by volume of hot orthodichlorobenzene; then 100 parts by volume of orthodichlorobenzene are added to the residue, the mixture stirred overnight on a steam bath and clarified by filtration. (The heating on a steam bath and clarification is repeated.) The solution is then cooled and saturated with hydrogen chloride. The product, in the form of its hydrochloride, is collected by filtration and dissolved in 250 parts of water. 60 parts by volume of 40% aqueous sodium acetate are added. The product precipitates and is filtered and vacuum-dried.

EXAMPLE 9

*Conversion of the Demethoxylated Product of Example 6 to an N-Quaternized Dye*

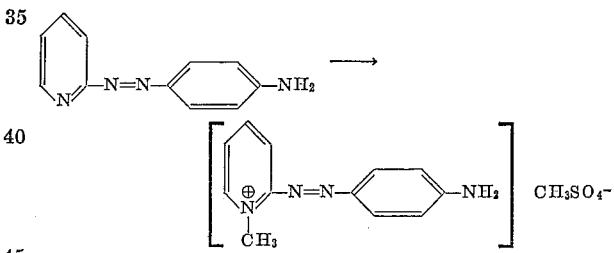

A slurry of 9.9 parts of the product of Example 6 and 1100 parts by volume of dry orthodichlorobenzene is heated to 62° C. 4.75 parts by volume of dimethyl sulfate in 500 parts by volume of dry orthodichlorobenzene are added gradually at 68–72° C. and stirred at this temperature until quaternization is complete. The product is filtered, stirred in petroleum ether, refiltered and dried. A sample of polyacrylonitrile fiber dyed with this product gives a bluish-red dyeing of excellent lightfastness.

EXAMPLE 10

*N-Ethyl-2-p-Aminophenylazo-Pyridinium Iodide*

In the procedure of Example 9, 5.8 parts of ethyl iodide is substituted for 4.75 parts of dimethyl sulfate to yield the corresponding N-ethyl dye which dyes polyacrylonitrile a bluish-red of excellent lightfastness.

EXAMPLE 11

A. *Preparation of 2-(p-Morpholinophenylazo)4-Methylpyridine N-Oxide*

In the procedure of Example 1, part A, if 26.0 parts of dimethylaniline are replaced by 37 parts of N-phenylmorpholine and 22.02 parts of 2-amino-pyridine-N-oxide are replaced by 24.8 parts 2-amino-4-methylpyridine N-oxide the product 2-(p-morpholinophenyazo)-4-methylpyridine-N-oxide is obtained.

B. *N-Methoxy-2-(p-Morpholino-Phenylazo)Pyridinium Methosulfate*

In the procedure of Example 1, part B, 4.85 parts of the product of Example 1, part A, are replaced by 7.0 parts of 2-(p-morpholinophenylazo)-4-methylpyridine-N-oxide to yield the product N-methoxy-2-(p-morpholinophenylazo)-4-methylpyridinium methosulfate.

The product dyes polyacrylonitrile fibers blue-violet when applied from a weakly acid bath.

The corresponding p-pyrrolidino, p-piperazino and p-piperidino derivatives are likewise prepared by substituting N-phenypyrrolidine, N-phenylpiperazine and N-phenylpiperidine in the foregoing procedure.

We claim:

1. Compounds of the formula:

$$[R-N=N-Ar]^+X^-$$

wherein R is a member selected from the group consisting of N-lower alkoxy-2-quinolinium, N-lower alkoxy-2-pyridinium and N-lower alkoxy-1-isoquinolinium radicals, any substituents on said R being selected from the group consisting of lower alkyl, lower alkoxy and halo radicals and Ar is the radical of an aromatic carbocyclic coupling component of less than three 6-membered rings having an amino group in a position conjugated with the azo linkage, any substituents on said Ar being selected from the group consisting of lower alkyl, lower alkoxy and halo radicals, the conjugated amino group being of the formula

wherein R'' and R' are individually selected from the group consisting of hydrogen, lower alkyl, aralkyl, cyano-lower alkyl, hydroxyethyl and, when joined together,

—CH₂—CH₂—CH₂—CH₂—
—CH₂—CH₂—CH₂—CH₂—CH₂—
—CH₂—CH₂—O—CH₂—CH₂— and

—CH₂—CH₂—NH—CH₂—CH₂— and X is an anion.

2. N-lower alkoxy-2-[p-(N,N-dialkylamino)phenylazo] pyridinium salts.

3. 2 - [p - (dimethylamino)phenylazo]-1-methoxypyridinum methosulfate.

4. 2-(p-aminophenylazo)-1-methoxypyridinum methosulfate.

5. The process of dealkoxylating a compound of claim 1 which comprises treating said compound with ammonia in an aqueous alcoholic reaction medium at a temperature in the range of 60° C. to reflux and isolating the corresponding N-unsubstituted derivative.

6. The process of claim 5 wherein an aqueous ethanolic solution is employed.

References Cited in the file of this patent

UNITED STATES PATENTS

| | | |
|---|---|---|
| 2,864,813 | Bossard et al. | Dec. 16, 1958 |
| 2,893,816 | Tsang et al. | July 7, 1959 |
| 3,051,697 | Lewis et al. | Aug. 28, 1962 |

OTHER REFERENCES

Colonna et al. "Gazz. Chim. Ital." v. 85, Fasc. XI pp. 1508–1518, November 1955.

Gardner et al. "J.C.S." (London), pp. 4375–4385, 1957.